(12) United States Patent
Smith

(10) Patent No.: US 6,688,961 B2
(45) Date of Patent: Feb. 10, 2004

(54) POULTRY BREAST MEAT APPORTIONING METHOD

(76) Inventor: Jeffrey P. Smith, 60 Lawn Ave., Columbus, OH (US) 43207

( * ) Notice: Subject to any disclaimer, the term of this patent is extended or adjusted under 35 U.S.C. 154(b) by 0 days.

(21) Appl. No.: 10/359,762

(22) Filed: Feb. 6, 2003

(65) Prior Publication Data

US 2003/0148726 A1 Aug. 7, 2003

Related U.S. Application Data

(60) Provisional application No. 60/355,369, filed on Feb. 7, 2002.

(51) Int. Cl.[7] ............................................. A22C 21/00
(52) U.S. Cl. ............................................ 452/160
(58) Field of Search .......................... 452/174, 149, 452/160, 150, 155; 426/518

(56) References Cited

U.S. PATENT DOCUMENTS

| | | | |
|---|---|---|---|
| 2,243,951 A | * 6/1941 | Gehlke | 452/160 |
| 3,942,222 A | * 3/1976 | Strandine et al. | 452/148 |
| 5,370,573 A | * 12/1994 | Warren et al. | 452/149 |
| 5,569,070 A | 10/1996 | Smith | |
| 5,779,532 A | * 7/1998 | Gagliardi, Jr. | 452/149 |
| 5,827,116 A | * 10/1998 | Al et al. | 452/170 |
| 5,932,278 A | * 8/1999 | Gagliardi, Jr. | 426/644 |
| 6,238,281 B1 | * 5/2001 | Gagliardi, Jr. | 452/135 |
| 6,383,068 B1 | 5/2002 | Tollett et al. | |
| 6,604,991 B1 | * 8/2003 | Jurs et al. | 452/150 |

* cited by examiner

*Primary Examiner*—Thomas Price
(74) *Attorney, Agent, or Firm*—Mueller and Smith, LP.

(57) ABSTRACT

A method for apportioning larger poultry breast wherein the forward region of the breast is compressed to a flat uniform thickness, $t_1$. The rearward tapering portion of the breast is compressed to a uniform thickness $t_2$. Compression of these portions of the breast is undertaken in conjunction with containment walls. Following such compression, the breast portions are peripherally trimmed to provide a defined shape. Then, the breast forward portion at thickness $t_1$ is horizontally slit to provide at least two meat products.

14 Claims, 16 Drawing Sheets

POULTRY BREAST MEAT APPORTIONING METHOD

CROSS-REFERENCE TO RELATED APPLICATIONS

This application claims the benefit of U.S. Provisional Application No. 60/355,369 filed Feb. 7, 2002.

STATEMENT REGARDING FEDERALLY SPONSORED RESEARCH

Not applicable.

BACKGROUND OF THE INVENTION

The processing of meat, and especially of poultry, has bourgeoned to where over four billion chickens are processed and sold yearly in the United States. The consumption of poultry in the United States has increased to where, for the first time since 1988, it exceeded that of beef. Such increase has been attributed to the recommendation of many medical groups that red meats be substituted with poultry or fish having a relatively lower percentage of saturated fat as a means of reducing overall serum cholesterol levels and attendant risk of heart disease.

Spurred largely by consumer demand, producers of prepared and packaged foods, as well as restaurateurs, have been using more and more poultry, and have required suppliers to deliver products meeting quite stringent size and weight specifications.

A variety of mechanisms have been developed with the purpose of apportioning chicken breasts. For the most part these devices have failed to reliably cut meat portion margins and have failed to accurately accommodate for the inherent orientation memory of muscle fibers. The former separation defect required hand trimming to achieve an acceptable profile, while the later defect resulted in uneven cooking attributes.

In 1995, Smith introduced a controlled volume chicken breast apportioner which exhibited the advantages of carrying out very reliable separation and which functioned to accurately overcome orientation memory to achieve both uniform thickness from portion-to-portion and contribute to improved cooking attributes. Described in U.S. Pat. No. 5,569,070 issued Oct. 29, 1996, the apportioner employs a blade containing an upper cutting head die wherein the blade is combined with a rearwardly disposed compression surface. This upper die cooperates with a sequence of platens each of which incorporates a boundary slot for receiving the die blade and an associated bearing surface configured to engage the compression surfaces. This combination achieves highly reliable severing. The apparatus further incorporates a thickness defining compression component, which both reduces orientation memory and controls the shape of the resultant meat product. The Smith device efficiently prepared chicken breast cutlets from breasts having weights ranging from about 7 ounces to about 28 ounces.

Over the somewhat recent past, chicken producers in the United States have been called upon to grow larger birds which, in turn, provide larger breasts ranging in weight from about 16 to about 24 ounces. To accommodate for these larger sizes, some producers have "horizontally" severed the breasts in half prior to submitting them to apportioning systems. When so severed in half the thinner tapering rearward region of the breast is unavailable for forming primary cutlets, the weight-based value of which is comparatively higher. Correspondingly, a substantial portion of the original breast is consigned to less profitable forms of meats which for the most part, are ground. In contrast the more profitable primary cutlets are configured for bun or plate coverage.

BRIEF SUMMARY OF THE INVENTION

The present invention is addressed to a method for apportioning poultry breast which provides a substantially improved yield of higher quality products intended for plate or bun utilization. Employing an adaptation of the earlier Smith apportioning apparatus, the method utilizes dual conformance paddle assemblies having flat compression surfaces. One such assembly is used to form with a platen mounted forward containment wall a forward breast portion of uniform thickness $t_1$. A second such conformance paddle assembly is utilized in conjunction with a platen mounted rearward containment wall to form a rearward compressed breast portion of uniform thickness, $t_2$ which is selected to be about one half the thickness $t_1$. A die assembly then is utilized to complete the product peripheral definition with a trimming action. Then, the peripherally defined, uniformly thick forward portion is severed horizontally to derive two or more quality meat products. Typically each of these forward products will exhibit a thickness, $t_1/t_2$.

Another feature and object of the invention is to provide a method of apportioning poultry breast into meat products wherein the breast has a forward portion tapering to a thinner rearward portion and a whole breast weight equal to or greater to about sixteen ounces. The method comprises the steps of:

(a) compressing the breast forward portion against a containment wall defining at least a portion of the periphery of a forward meat product. This compression establishes substantially flat upper and lower meat surfaces which are spaced apart a substantially uniform forward thickness, $t_1$;

(b) compressing the breast rearward portion against a containment wall defining at least a portion of the periphery of a rear meat product. This compression establishes substantially flat upper and lower meat surfaces which are spaced apart a substantially uniform rear thickness, $t_2$ which is less than the forward thickness $t_1$;

(c) severing the compressed breast forward portion from the compressed breast rearward portion;

(d) trimming the compressed breast forward portion to define a forward periphery of a meat product exhibiting thickness $t_1$; and (e) horizontally severing the compressed and trimmed breast lower portion.

Other objects of the invention will, in part, be obvious and will, in part, appear hereinafter. The invention, accordingly, comprises the method possessing the steps which are exemplified in the following detailed description.

For a fuller understanding of the nature and objects of the invention, reference should be made to the following detailed description taken in connection with the accompanying drawings.

DETAILED DESCRIPTION OF THE INVENTION

Figure 1:
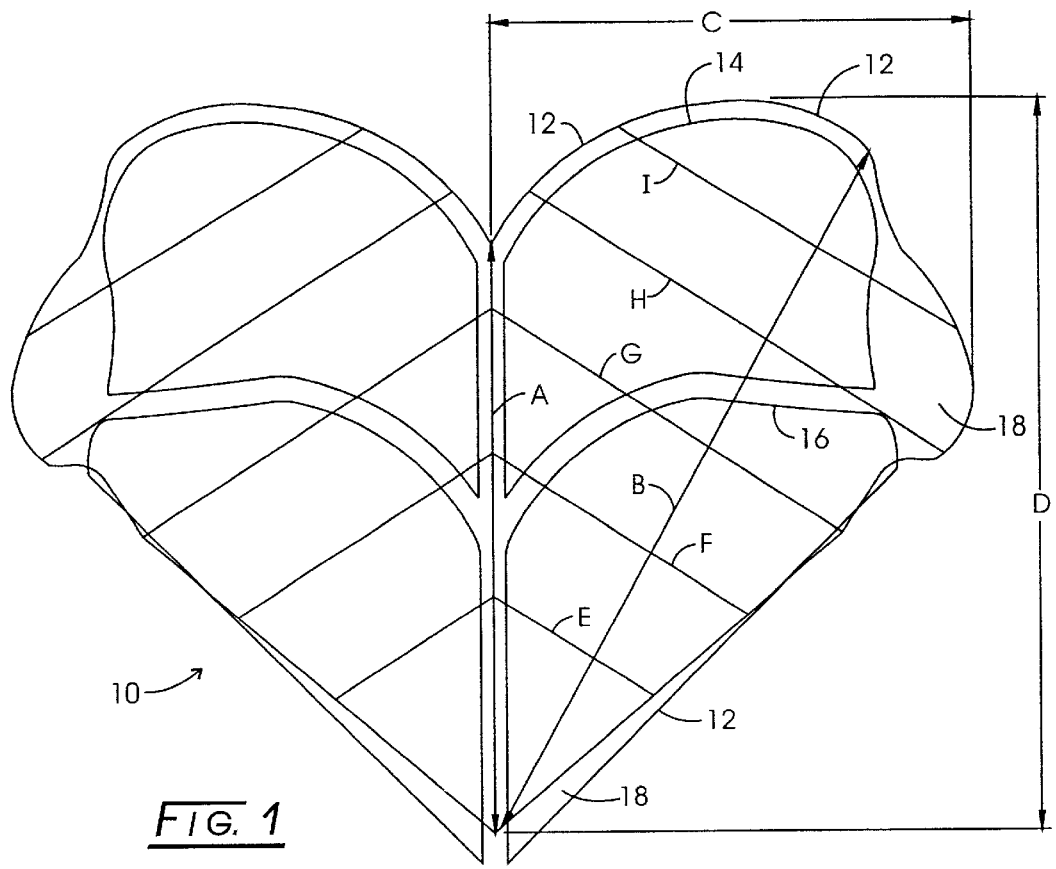
FIG. 1 is a schematic view of a whole chicken breast showing cuts which may be developed from it and showing dimensional aspects.

The relatively abundant size of chicken breast which are apportioned in accordance with the method of the invention is revealed in connection with FIG. 1. In that figure, a somewhat stylized representation of one of the unprocessed full chicken breasts is represented in general at 10. Breast 10 is shown having an outer periphery identified at 12. As quantified in Table 1, one half of this whole breast 10 is defined as having dimensions A-I. Additionally represented in the figure is one embodiment showing the periphery of resultant forward and rearward products resulting from the method and shown respectively at 14 and 16. In order to accurately define these peripheries, a relatively small amount of trim is produced, for example, as represented at 18.

Figure 2:
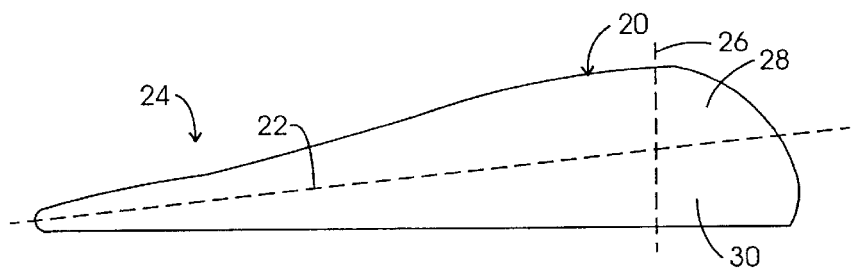
FIG. 2 is a schematic profile of a large size breast of chicken showing a method of the prior art apportioning it.

Looking to FIG. 2, an approach to apportioning present in the prior art is revealed. In the figure, a major cross section of one half of a chicken breast is represented at 20. The prior art approach to apportioning breast 20 has been to somewhat horizontally and longitudinally slice the breast 20 in half as represented at dashed line 22. Then, the rearward portion of the breast 20, as represented generally at 24, was removed by vertical severance as represented at dashed line 26. Following this severance, two parts of the forward portion of the breast as at 28 and 30 were then provided. However, with this approach the rearward portion 24 was too thin and, therefore, considered as less profitable trim. As is apparent, this earlier technique is both inefficient and uneconomical.

Referring to FIGS. 3 through 6, an apparatus by which the method of the invention carried out is represented in general at 30. The principal components of apparatus 30 includes a die assembly 32 and at least one and preferably four platens 34a–34d. An upwardly disposed actuator assembly is represented generally at 36, while a lower actuator or indexing assembly is represented generally at 38.

FIGS. 3–6 reveal that the apparatus 10 incorporates a square tubular base represented generally at 40. Base 40 is formed with four corner positioned upstanding legs 42–45 which extend to an upper frame represented generally at 46. Base 40 further includes indexing mechanism 38 mounted upon horizontal support struts 48, 50 and 52. Support struts 48 and 50 support an indexing drive motor 54, the rotational output of which is directed to a gear assembly 56. Gear assembly 56 rotationally drives a turntable 58 which, in turn, supports a radially disposed roller 60 which cooperates with a follower component 62. Follower component 62 is coupled in driving relationship with an upstanding shaft 64 which is rotatable about an axis 66. Similarly, turntable 58 is shown as being rotatable about an axis 68. Follower component 62 additionally is configured incorporating slots 70a–70d (FIGS. 3 and 7) arranged in quadrature. With this arrangement, the indexing assembly 38 assumes the characteristics of a Geneva mechanism by which rotational action is imparted to the shaft 64.

Figure 3:
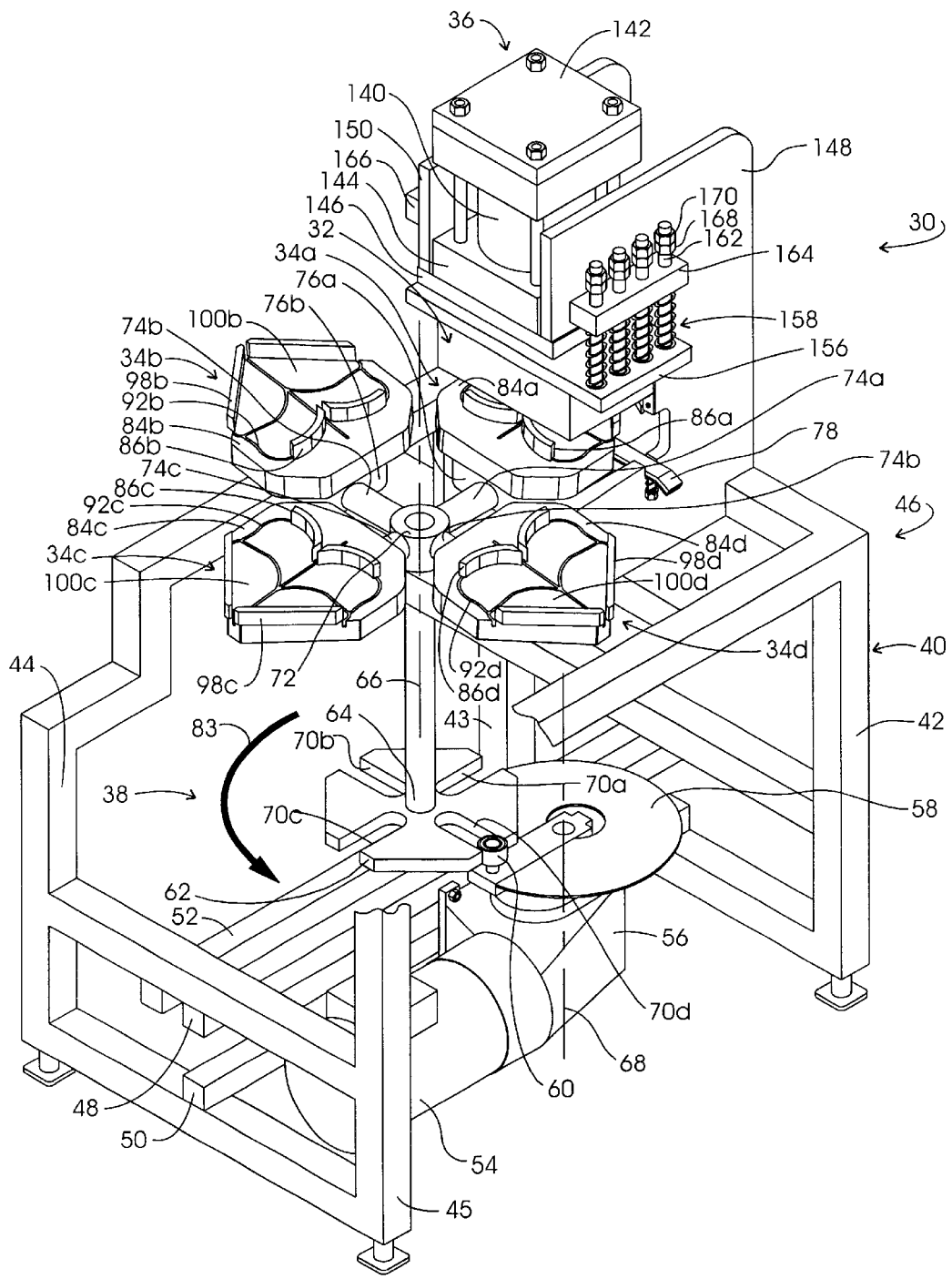
FIG. 3 is a perspective view of an apparatus for carrying out the method of the invention.
Figure 4:
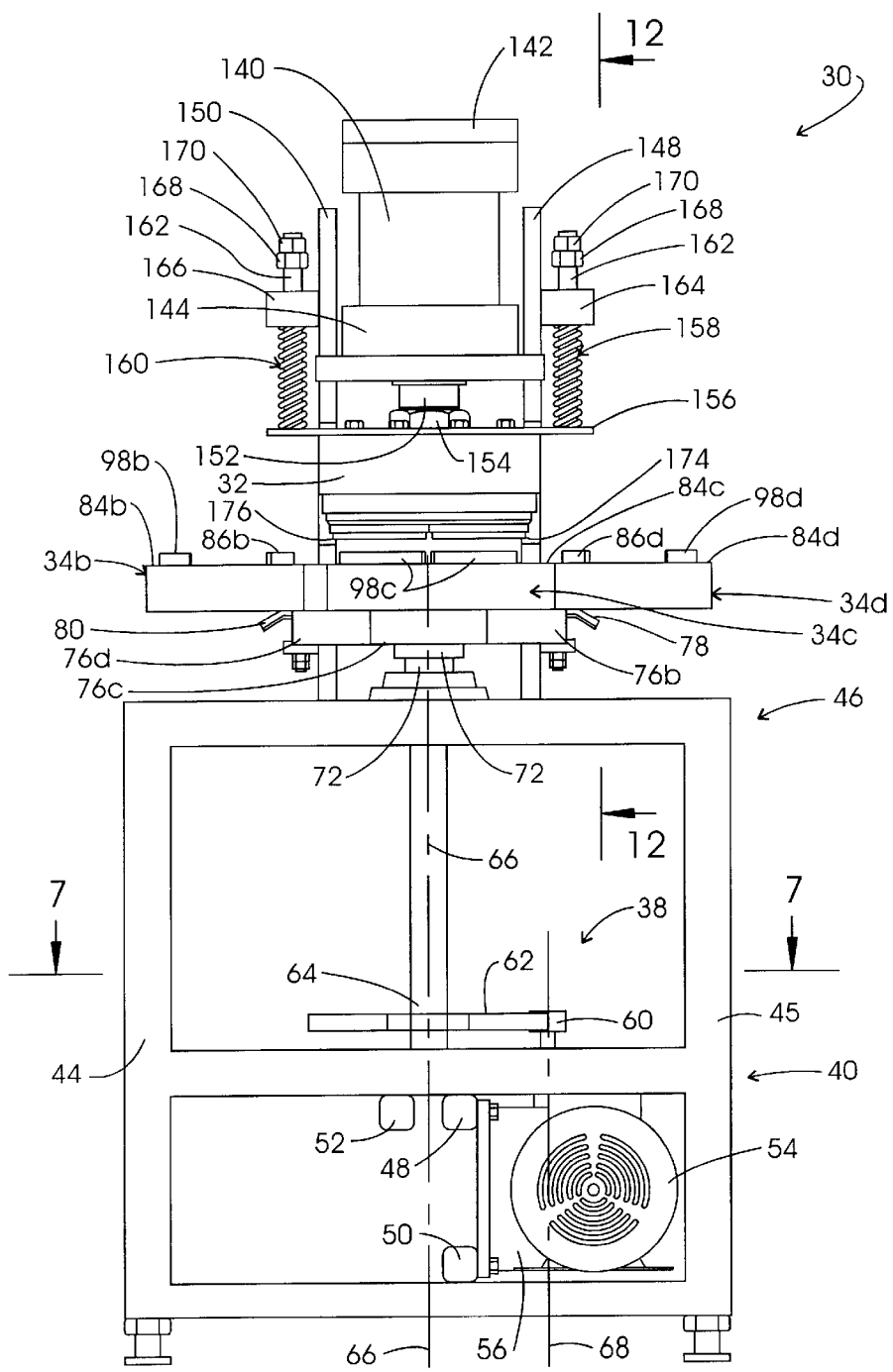
FIG. 4 is a front view of the apparatus of FIG. 3.
Figure 5:
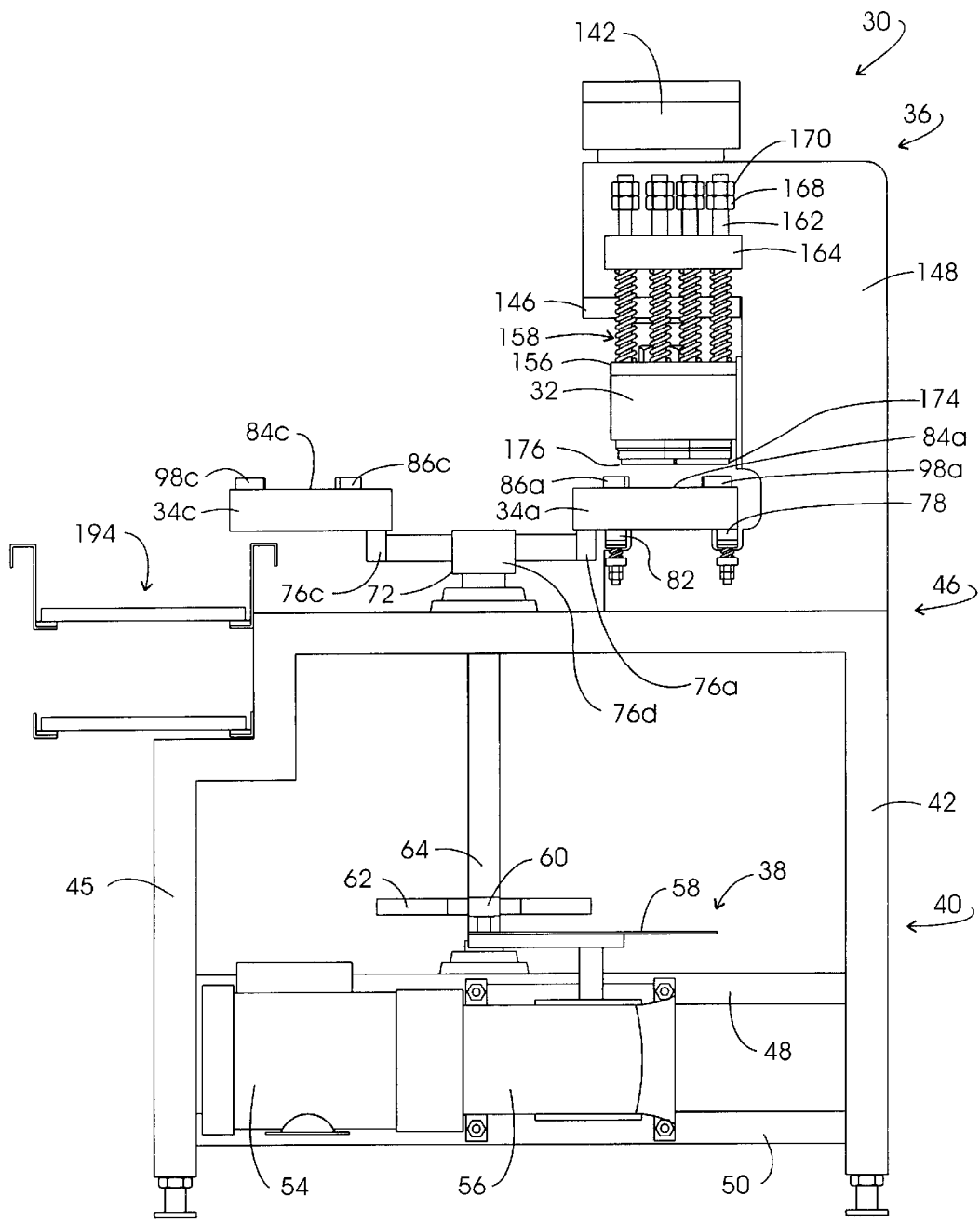
FIG. 5 is a right side elevational view of the apparatus of FIG. 1.
Figure 6:
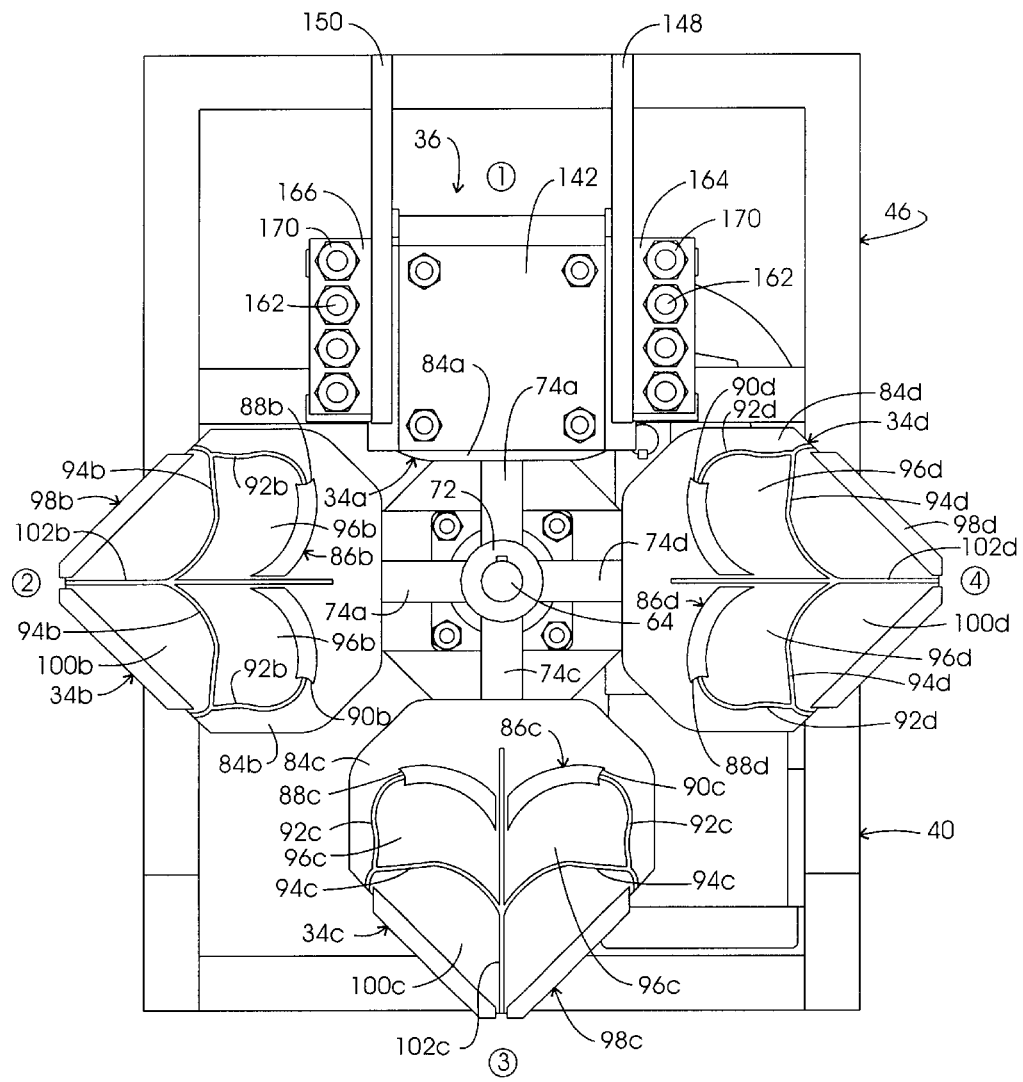
FIG. 6 is a top view of the apparatus of FIG. 1.
Figure 7:
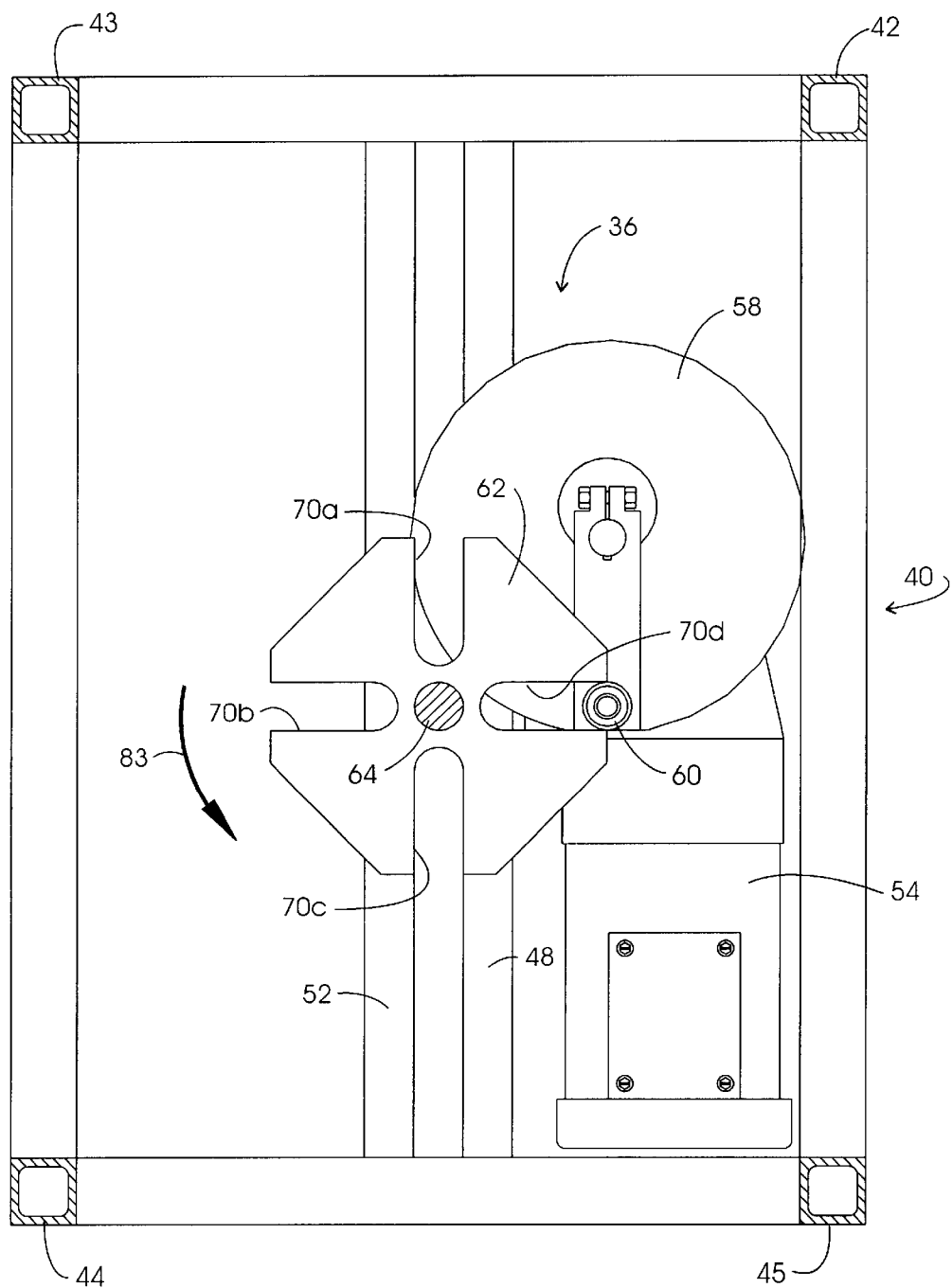
FIG. 7 is a cross sectional view taken through the plane 7—7 shown in FIG. 12.

Indexing shaft 64 extends upwardly to a hub 72 which, in turn, supports four radially disposed arms 74a–74d arranged in quadrature. Arms 74a–74d extend to upstanding connector tabs shown respectively at 76a–76d (FIGS. 3 and 4). Tabs 76a–76d are inserted within slots (not shown) within the undersides of the respective platens 34a–34d. With the arrangement shown, and is seen in particular in FIG. 6, the Geneva mechanism functions to, in effect, define four stations which are numbered in the figure as such. At station 1 compression and cutting takes place, while at station 2, trim and meat products are removed for conveyer transport. At station 3 the platens are loaded and at station 4 the platens commence to be moved upon a ramp such as at 78, 80 and 82 as seen in FIGS. 3 and 4. FIGS. 1 and 6 reveal one embodiment of the structuring of the platens 34a–34g providing for the production of six quality meat products in conjunction with a comparatively small amount of trim. Each platen 32a–32d is configured having an upwardly disposed flat support surface shown respectively at 84a–84d. Also, each platen is formed having an upstanding forward containment wall represented in general respectively at 86a–86d. For the instant embodiment, those forward containment walls are, in effect, split in half. Walls 86a–86d extend between forward wall termini shown at 88a–88d and at 90a–90d. Extending from the forward wall termini 88a–88d and 90a–90d is a severance boundary having a medial portion shown at 92a–92d. Those medial portions 92a–92d extend to severance boundary rearward portions shown at 94a–94d. Accordingly, the forward containment walls 86a–86d combine with the severance boundary portions 92a–92d and 94a–94d to define forward regions having a shape or periphery which corresponds with the ultimately derived forward meat product peripheral shape. Those forward regions are represented at 96a–96d.

Also mounted upon the support surfaces 84a–84d are rearward containment walls represented generally at 98a–98d. The generally v-shaped walls 98a–98d combine with the severance boundary rearward portions 94a–94d to define respective rear regions 100a–1002d. For the present configurational embodiment, the forward regions 96a–96d and rear regions 100a–100d are severed in half by a longitudinal component of the severance boundaries as shown respectively at 102a–102d. These longitudinal components provide for the production of six well defined accompanied products.

Figure 8:
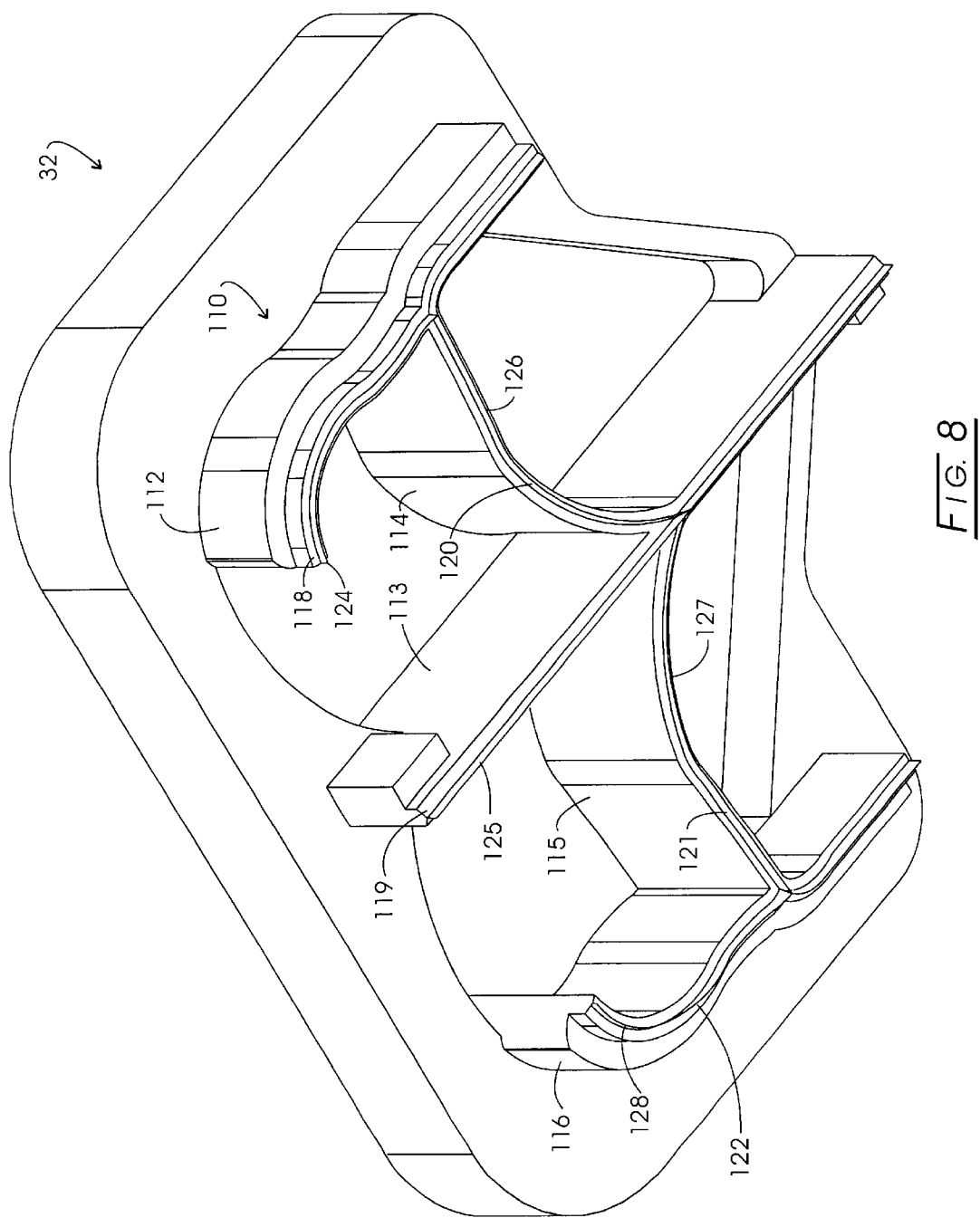
FIG. 8 is a perspective view of a die assembly of the apparatus of FIG. 3.

Platens 34a–34d as thus configured, perform in conjunction with a die assembly as earlier described in general at 32, as well as in conjunction with conformance paddle assemblies which establish requisite meat thicknesses in operational association with the containment walls as well as boundaries or peripheries in conjunction with the severance boundaries. Looking to FIG. 8, die assembly 32 is revealed at a higher level of detail. The assembly is configured having a downwardly depending severance component represented generally at 110. Severance component 110 is configured to be coextensive with the severance boundary components described at 92a–92d 94a–94d and 102a–102d. The component 110 is formed with downwardly extending supports 112–116 which, in turn, support wedge-shaped compression surfaces shown respectively at 118–122. Extending further outwardly from the center of the compression surfaces 118–122 are respective blades 124–128.

Figure 9:
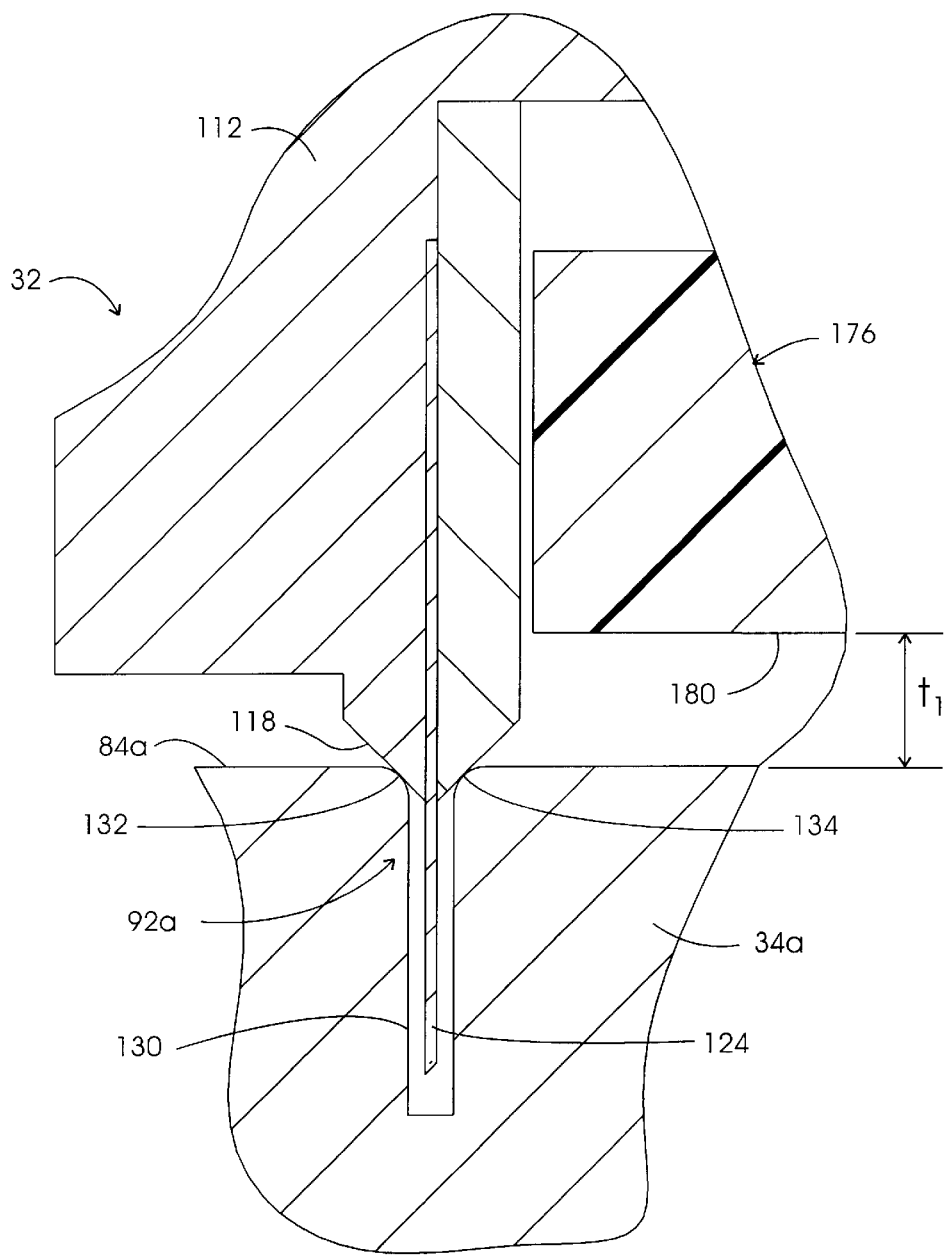
FIG. 9 is an enlarged partial sectional view taken from FIG. 10.

Looking additionally to FIG. 9, compression surface 118 and blade 124 are shown in operative association with severance boundary medial portion 92a of platen 34a. Note that the severance boundary is formed as a slot 130 extending inwardly from the support surface 84a of platen 34a. The upper edges of the slot 130 are radiused as at 132 and 134. Accordingly, as the die assembly 32 descends the encountered meat will be severed by the blade as at 124, whereupon complete severance is assured by the engagement of compression surface 118 with the radiused slot edges 132 and 134.

Figure 10:
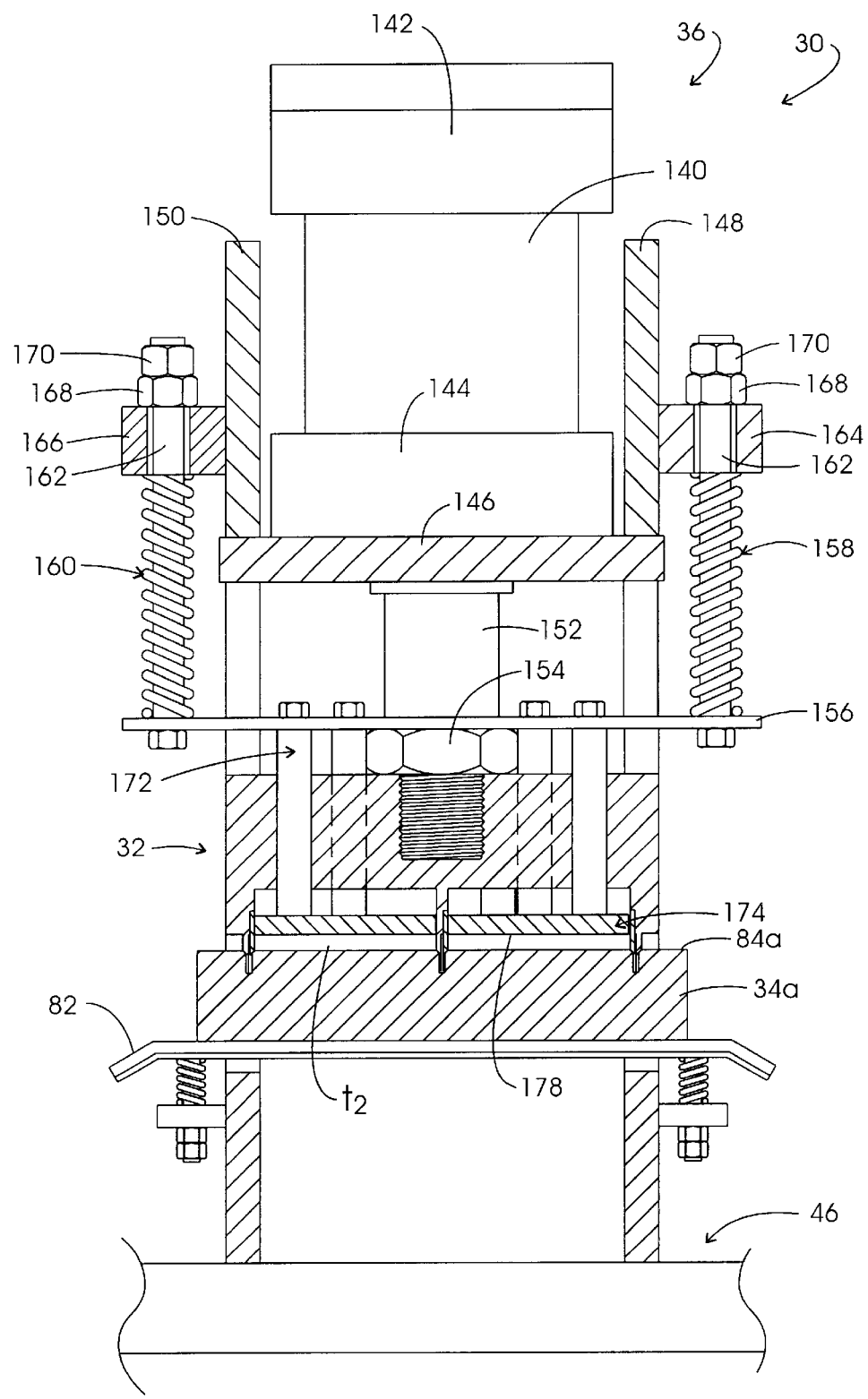
FIG. 10 is a sectional view taken through the plane 10—10 in FIG. 12.

FIGS. 1 and 10 reveal that the die assembly 32 is moved between retracted and extended orientations by a hydraulic cylinder 140 fixed between an upper mount 142 and lower mount 144. Lower mount 144, in turn, is coupled to a mounting plate 146 which, in turn, is fixed to side mounts 148 and 150. FIG. 10 reveals a dual acting piston 152 extending from the cylinder 140 which is threadably connected to die assembly 32 in conjunction with a spacer nut 154. FIG. 10 shows the apparatus 30 with piston 152 fully extended such that the blades and compression surfaces of the die assembly are fully engaged with the corresponding severance boundaries of platen 34a. Note in the figure that the top of spacer nut 154 freely abuttably engages a drive plate 156. Plate 156 will have been driven to the compression position shown by oppositely disposed arrays of helical compression springs represented generally at 158 and 160. Each spring in the arrays 158 and 160 slidably extends over a drive rod, certain of which are represented at 162. These drive rods 162 are fixed at their lower ends to drive plate 156 and slidably extend through respective flange components 164 and 166. The amount of downward travel which rods 162 may undertake is limited by a threadably associated stop nut, certain of which are revealed at 168, which is combined with an associated lock nut certain of which are shown at 170. FIG. 10 further reveals that drive plate 156 supports an array of downwardly vertically extending slide rods represented generally at 172 which slidably extend through corresponding cylindrical channels within die assembly 32 and are connected with rearward and forward conformance paddle assemblies 174 and 176. Assembly 174 is revealed in FIG. 10. These assemblies are formed of polymeric material and exhibit flat compression surfaces intended to contact breast meat. Note in FIG. 10 that a compression surface 178 is present in conjunction with conformance paddle assembly 174 and that it is spaced above the support surface 84a of platen 34a. This spacing, identified as $t_2$ determines the thickness of the meat portion being developed.

Figure 11:
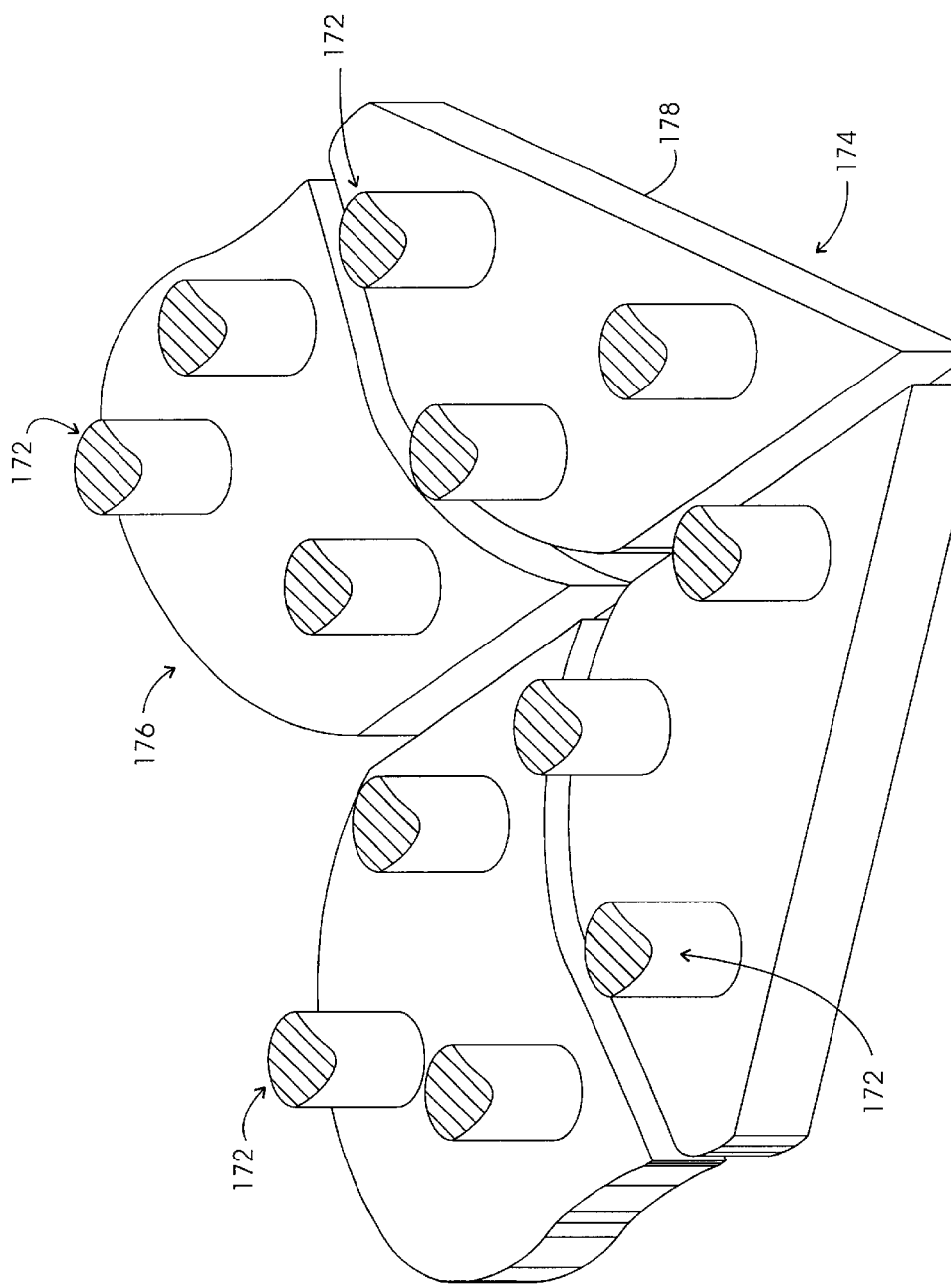
FIG. 11 is a is a perspective view of arrays of conformance paddle assemblies employed with the apparatus of FIG. 3.
Figure 12:
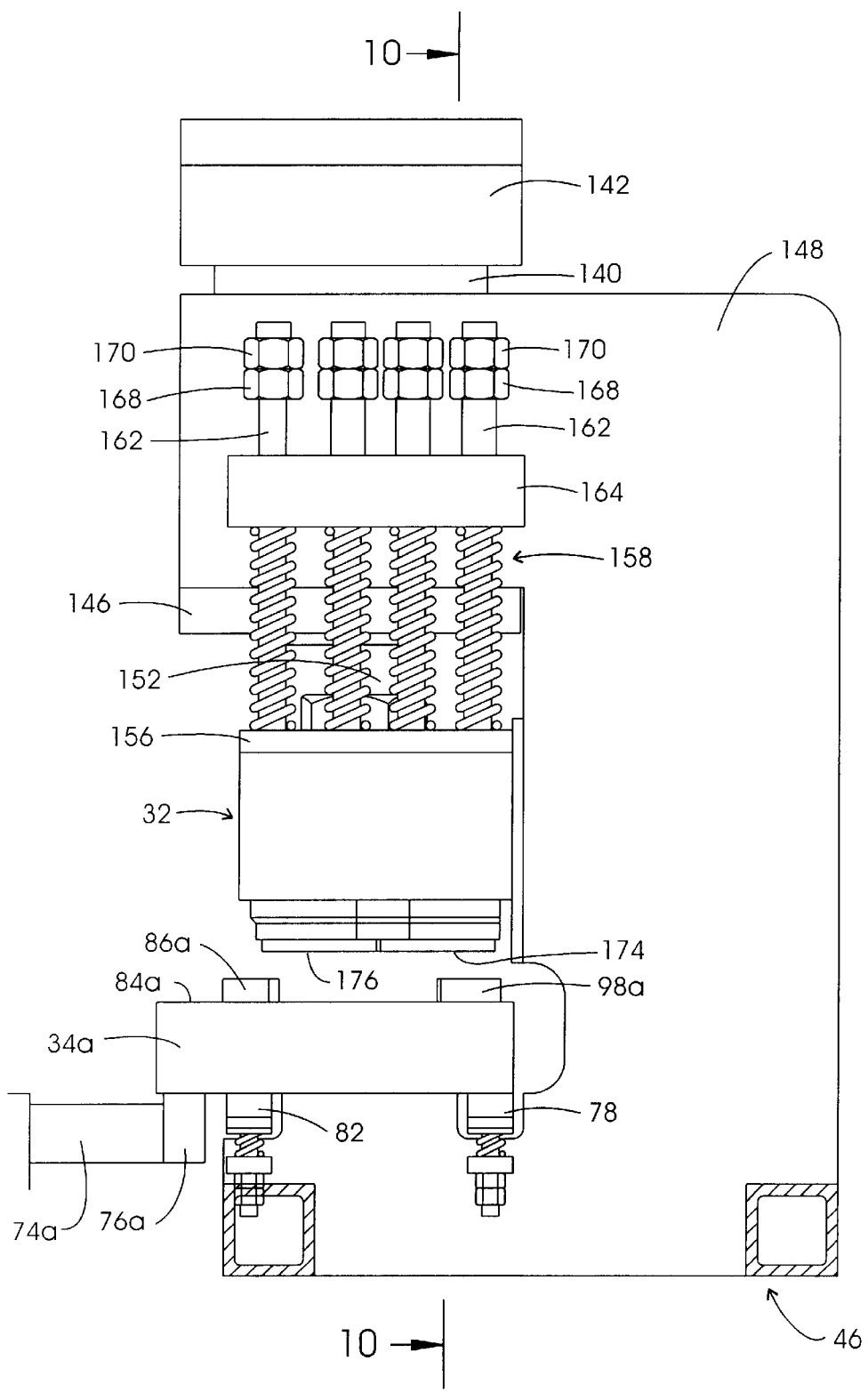
FIG. 12 is a sectional view taken through the plane 12—12 in FIG. 4.

Looking additionally to FIG. 11, the rearward conformance paddle assembly 174 is revealed in perspective fashion in association with forward conformance paddle assembly 176. For the method at hand, the rearward conformance paddle assembly 174 will move to a compression position lower than forward compression assembly 176. This is because the breast meat tapers rearwardly and, in accordance with the methodology of the invention, the meat products developed in conjunction with conformance paddle assembly 176 will be, for example, twice as thick as those evolved in conjunction with conformance assembly 174. In this regard, FIG. 9 reveals a portion of forward conformance paddle assembly 176 and associated compression surface 180 being spaced a distance, $t_1$ from platen 34a support surface 84a. FIG. 9 additionally shows the compression surface 180 to be in its compression position. In comparison, FIGS. 3, 4, 5 and 12 illustrate the orientation of drive plate 156 and associated drive rods 162 in a retracted orientation. This orientation is achieved by reversing drive piston 152 to elevate the die assembly 32 and in turn move drive plate 156 upwardly to load the arrays of springs 158 and 160. Correspondingly, when the piston 152 is driven downwardly, the spring arrays 158 and 160 drive plate 156 and associated conformance paddle arrays 174 and 176 downwardly ahead of the cutting action. This causes the breast positioned over of the platens to be compressed to a uniform thickness against the forward and rearward containment walls 86a–86d and 98a–98d. Additionally, the paddles will cause the meat to migrate over the severance boundaries assuring a uniform periphery for the meat products.

Figure 13:
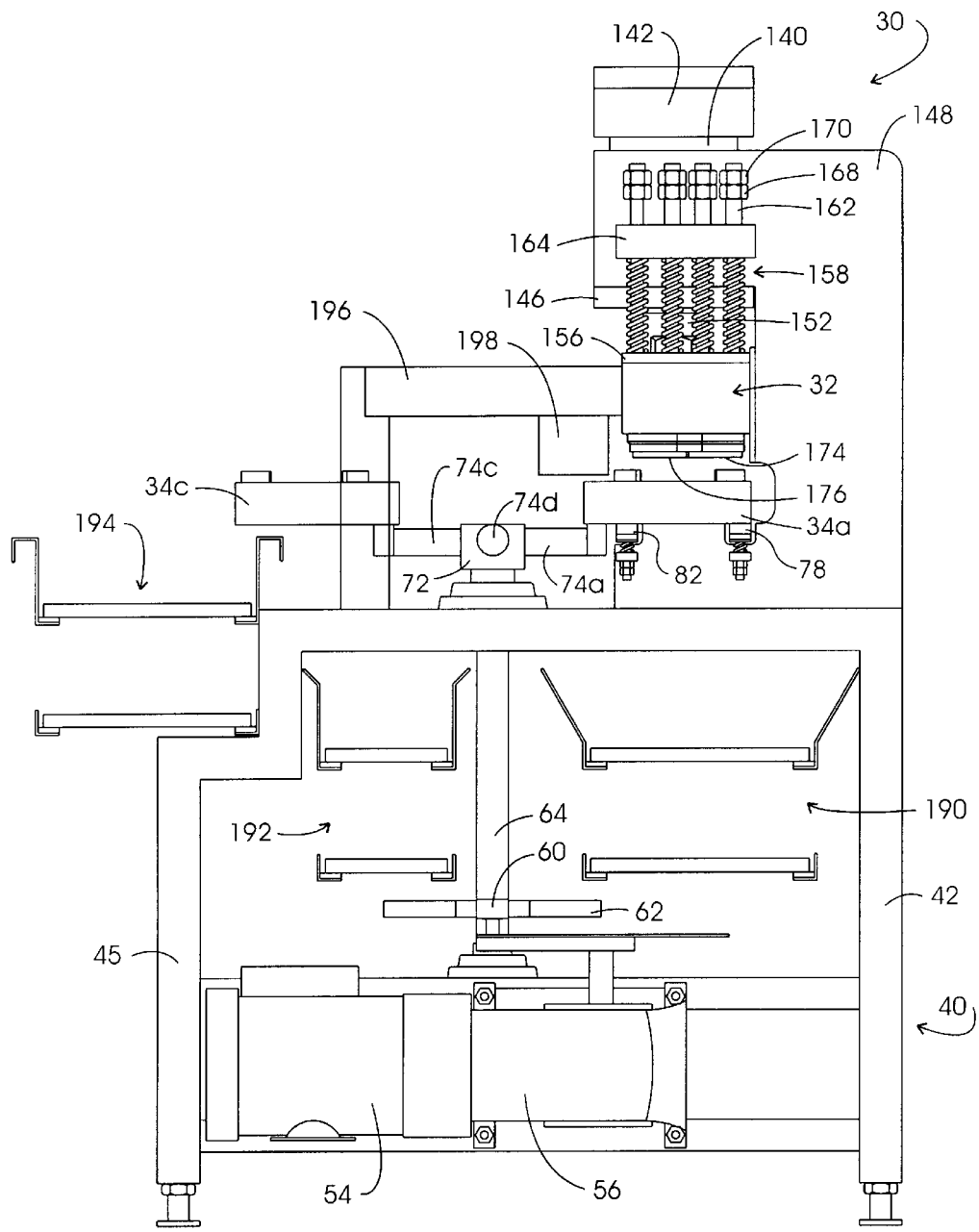
FIG. 13 is a front view of the apparatus of FIG. 3 as modified to include trim, feed, and product conveyer assemblies.

The apparatus 30 may be utilized in conjunction with a variety of conveyer configurations. Exemplaries such conveyer configurations are revealed in FIG. 13. Looking to that figure, a conveyer 190 is positioned to receive trim portions from the support surfaces of the platens 34a–34c. A conveyer 192 is positioned to receive the apportioned meat product from the platens and a conveyer 194 is positioned for conveying un-apportioned breast for loading at station 3 as shown in FIG. 6. Also shown in FIG. 13 is a wiper member 196 having a confrontation surface 198 disposed to contact and remove the treated meat products from the platens.

Figure 14:
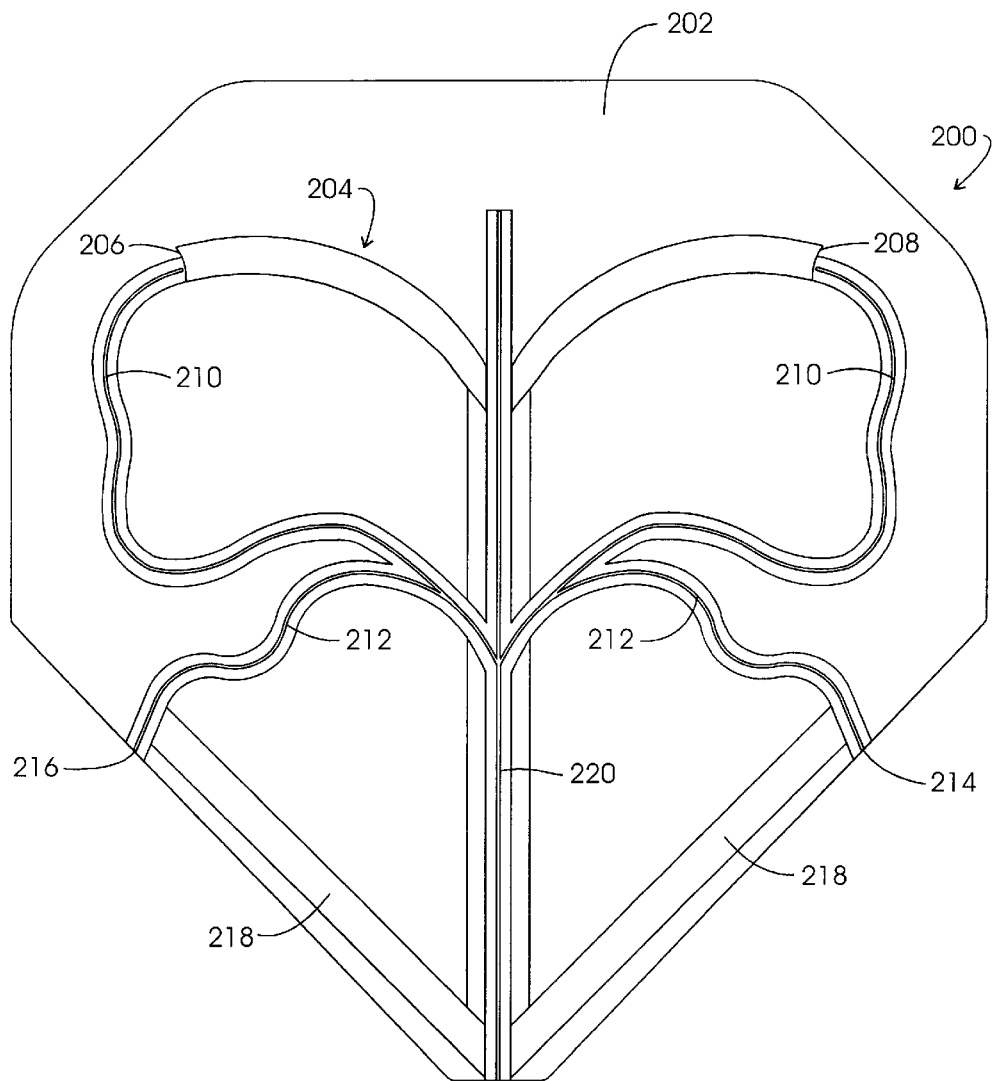
FIG. 14 is a top view of a platen showing a modified severance boundary pattern.

Referring to FIG. 14, a variation of the portioning patterns is illustrated in conjunction with a platen represented in general at 200. As before, platen 200 is formed with a support surface 202. Upstanding from the support surface 202 is a forward containment wall represented generally at 204 and extending between forward wall termini 206 and 208. Extending between these termini 206 and 208 is the medial portion of a severance boundary 210 which extends to a commonality with a rearward portion of the severance boundary represented at 212. The rearward portion of the severance boundary extends to the termini 214 and 216 of a rearward containment wall 218. As in the earlier embodiments, a longitudinal component of the severance boundary is provided at 220 to evolve a total of six meat products as opposed to three. As before, the die assembly severance component will exhibit a peripheral pattern configured to be coextensive with the severance boundaries of platen 200.

Figure 15:
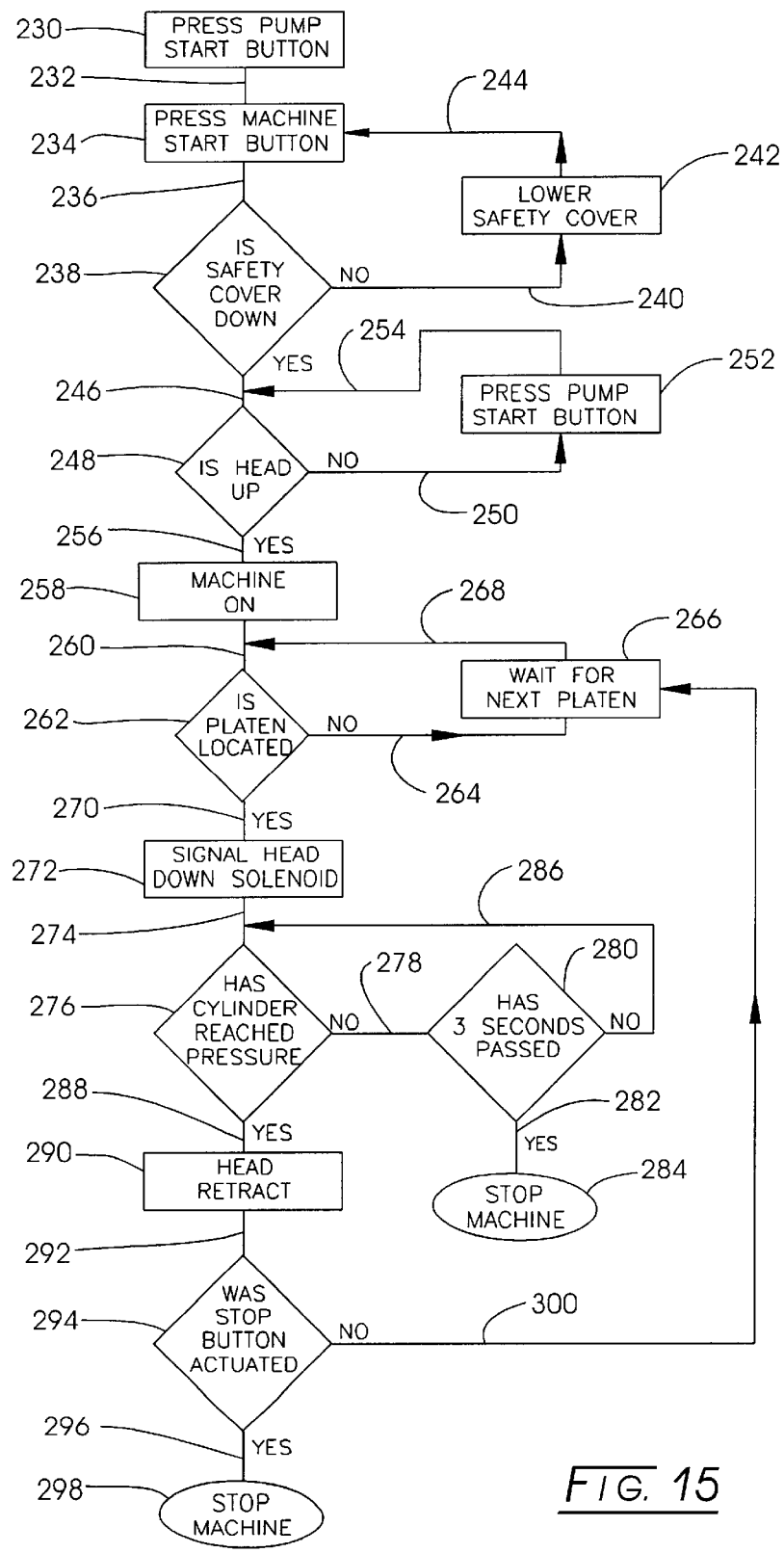
FIG. 15 is a schematic flow diagram of a representative sequence of operational steps for controlling the apparatus of FIG. 3.

Referring to FIG. 15, a control sequence for the apparatus 30 is illustrated in flow diagrammatic fashion. Entry into the operational sequence is represented at block 230 with the actuation of a start button initiating a pump for providing hydraulic fluid controlling of hydraulic cylinder 154. As represented at line 232 and block 234 the apparatus is then energized by the actuation of a second start button or switch. Following these initializations, as represented at line 236 and block 238 a determination is made as to whether a safety cover (not shown) is down. In the event that it is not, then as represented at line 240 and block 242, a visual cue is provided to the operator and the control dwells until such time that the cover is down. The program then returns to block 234 as represented at line 244.

Where the safety cover is down, then as represented at line 246 and block 248, the system determines whether the piston 152 of hydraulic cylinder 140 is retracted to its initial position. In the event that it is not, then as represented at line 250 and block 252 a visual cue is provided calling for the actuation of the pump start button. The control then dwells as represented at line 254 until appropriate retraction of the piston is carried out. Where the piston is in appropriate position, then as represented at line 256 and block 258 an indication is provided that the apparatus 30 is energized. Next, as represented at line 260 and block 262 a determination is made as to whether a platen is located in registration with the die assembly. Where it is not, then as represented at line 264 and block 266 the control system dwells until a next platen is in proper position. The control sequence then continues as represented at line 268. Where a platen is properly located with respect to the die assembly, then as represented at line 270 and block 272 a solenoid actuating the hydraulic cylinder 150 is energized to appropriately charge the hydraulic cylinder. Next, as represented at line 274 and block 276 a determination is made as to whether the hydraulic cylinder pressure has been acquired. In the event that it has not, then as represented at line 278 and block 280 a determination is made as to whether an interval of three seconds has occurred. In the event that it has, then a malfunction is considered to be at hand and as represented at line 282 and node 284 the apparatus 30 is stopped. Where three seconds has not passed, then as represented at line 286 the control sequence dwells.

Where proper cylinder pressure has been reached, then as represented at line 288 and block 290 the piston 152 is retracted to raise the die assembly and associated drive plate 156. The sequence further provides, as represented at line 292 and block 294 an operator initiated stoppage. Where a stop switch has been actuated by the operator, as represented at line 296 and node 298, apparatus 30 is stopped. However, where the operator has not actuated a stop switch, then as represented at line 300, the control sequence awaits the positioning of a next platen in registry with the die assembly.

Figure 16:
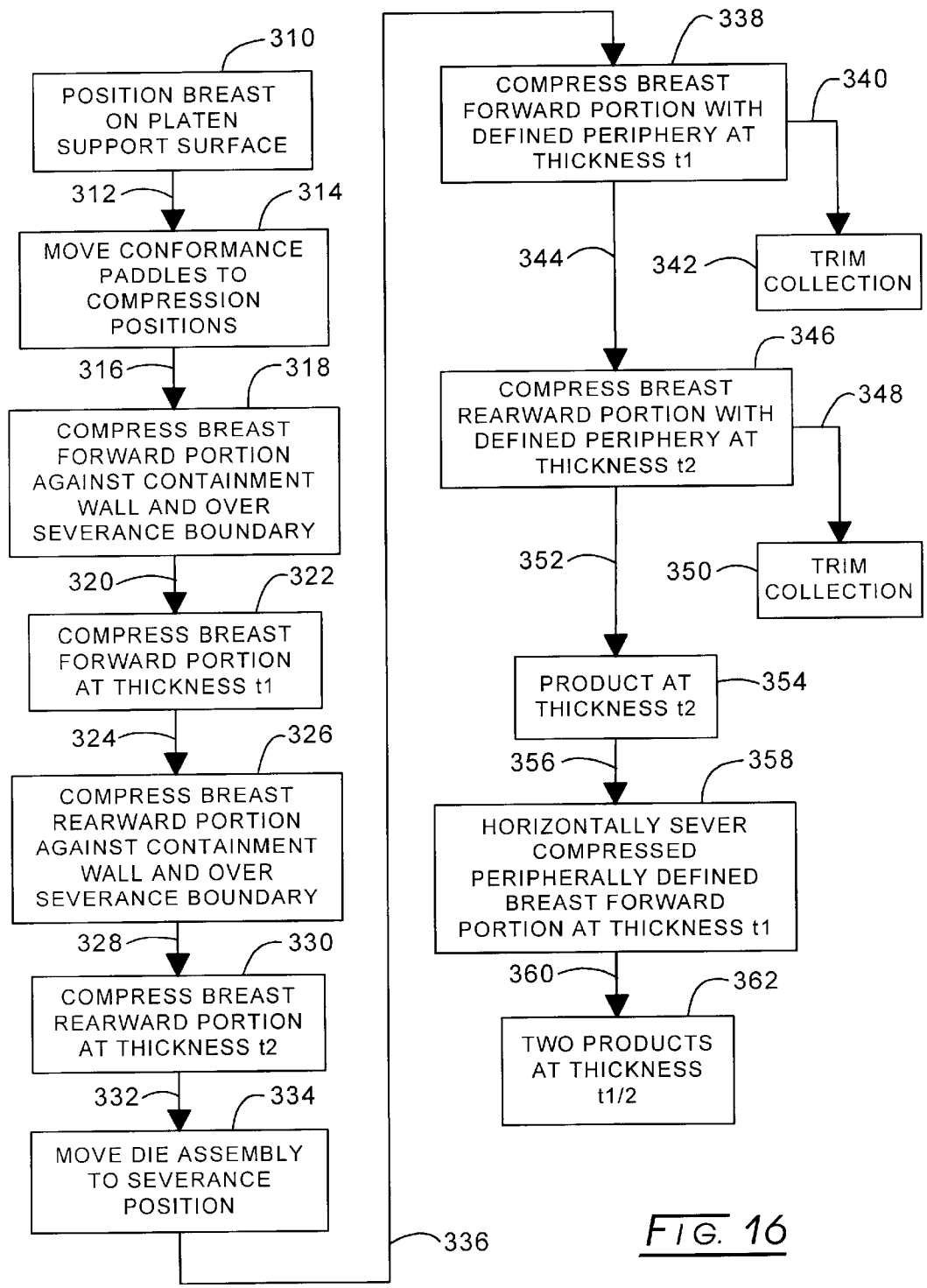
FIG. 16 is a flow diagram illustrating the method of the invention.

Referring to FIG. 16, a flowchart illustrating the method of the invention is presented. The method commences as represented at block 310 with the positioning for a whole breast upon the platen support surface. In connection with apparatus 30, this is carried out at station 3 as illustrated in FIG. 6. Placement of the breast is such that its thicker forward portion is located at forward region 96C and the tapering rearward portion of the breast is located over rear region 100c. Additionally with this placement, the forward periphery of the thicker portion of the breast is positioned in somewhat abutting adjacency with the forward containment wall 86c and the rearward periphery of the tapering portion of the breast is located so as to be somewhat adjacent rearward containment wall 98c. Next in the method, as represented at line 312 and block 314, the conformance paddles as described in connection with FIG. 11 are moved under the pressure of spring arrays 158 and 160 (FIG. 10) to their compression positions. As represented at line 316 and block 318 this will cause the breast forward portion to be compressed against the forward containment wall and further will cause the forward region of the breast to migrate over the severance boundary medial portion and rearward portion. It may be recalled that the compression surfaces 178 and 180 of the rearward and forward conformance paddles will reach and compressively contact the upwardly disposed surface of the breast before die assembly 32 enters into severing engagement with the associated platen. This compression, as represented at line 320 and block 322 will provide a compressed breast forward portion at a pre-established thickness $t_1$. That thickness, $t_1$ is elected so as to provide two high quality apportioned meat products. As represented at line 324 and block 326 the breast rearward portion is compressed by the rearward conformance paddle assembly 174 (FIG. 11) against the rearward containment wall of the platen and against the associated support surface to derive a uniform breast thickness $t_2$. This compression of the rearward portion of the breast also causes a quantity of the meat to migrate over the severance boundary so as to be cut by the die assembly 32. As represented at line 328 and block 330 this provides a compressed breast rearward portion at the noted thickness, $t_2$. Steps 318, 322, 326, and 330 may be performed sequentially, in any order, or simultaneously, with one or more platens. The forward and rearward breast portions now being compressed to their appropriate thicknesses and migration over the severance boundary, as represented at line 332 and block 334 die assembly 32 is moved from its retracted to its advanced position to carry out a vertical severance of the thickness conformed meat along the severance boundary. As represented at line 336 and block 338, this provides a compressed breast forward portion with a defined periphery at the noted thickness, $t_1$. Those components of the breast forward portion which migrated over the severance boundary are trim which is collected as represented at line 340 and block 342. In similar fashion, as represented at line 344 and block 346 a compressed breast rearward portion is derived having a defined periphery and at the noted thickness $t_2$. The compression of the forward and rearward portions may be performed sequentially, in either order, or simultaneously. Because the compression is designed to migrate an amount of breast meat over the severance boundary, a trim is evolved. As represented at line 348 and block 350 that trim is collected. This trim collection may occur sequentially, as illustrated, in reverse order, or simultaneously. The procedure provides, as represented at line 352 and block 354 a breast meat product at thickness $t_2$ which is ready for distribution to retailers at the properly designated thickness. Next, as represented at line 356 and block 358 the forward portions at thickness $t_1$ are submitted to a conventional horizontal slicer and are sliced into two component parts, each of which is a valuable product. These products are represented in connection with line 360 and block 362 as being two products at thickness $t_1/2$. The exact thickness for these products is generally at the election of the producer. Where longitudinal severance is provided and two product components are developed with respect to block 354 and four products are developed in connection with block 362. The products associated with block 362 will comprise a skin side product and a non-skin side product.

Figure 17:
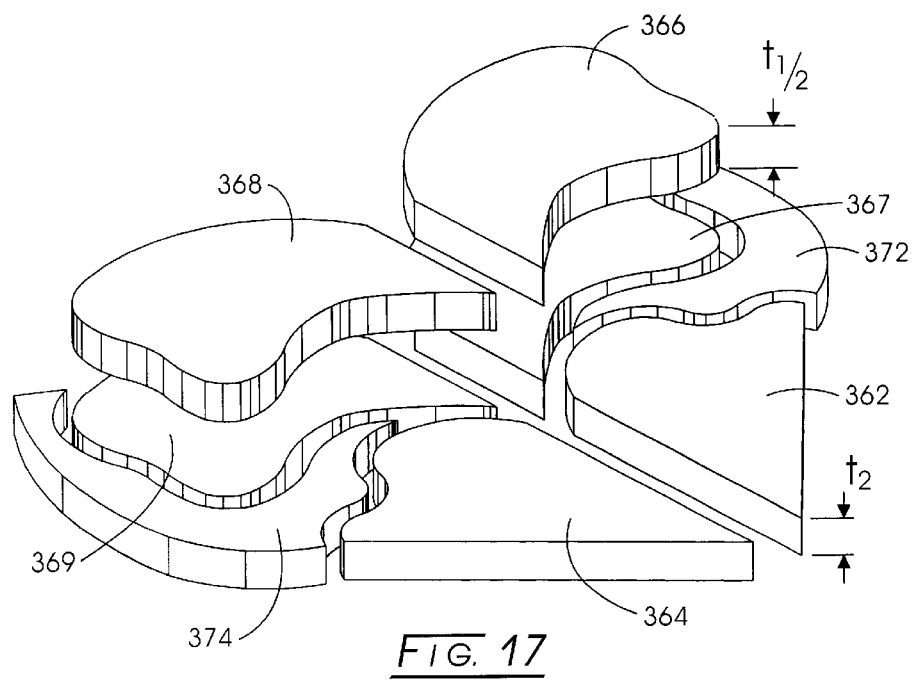
FIG. 17 is a perspective schematic view showing breast meat product developed with the pattern of FIG. 14.

Turning now to FIG. 17, representation of the breast meat products developed from platen 200 as described in connection with FIG. 14 is provided. In the figure, note that two peripherally defined rearward breast products at thickness $t_2$ are developed as represented at 362 and 364. Additionally, four high quality forward portion breast products at thickness $t_1/_2$ are developed as represented at 366–369. With the production of these quality products, an amount of trim is evolved as represented at 372 and 374.

Figure 18:
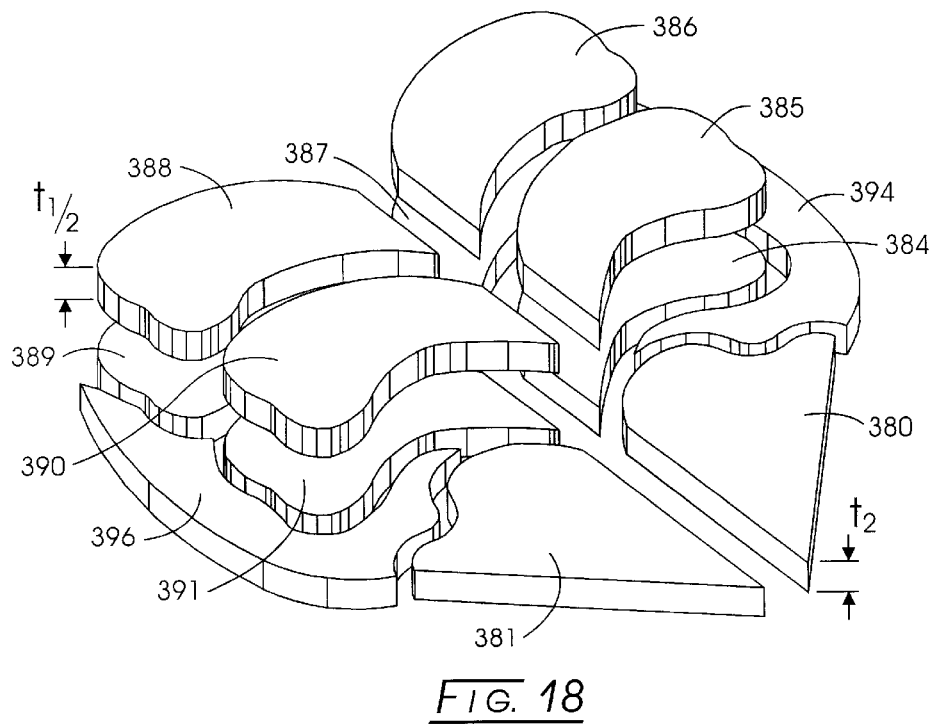
FIG. 18 is a perspective and schematic view of a ten product apportionment of poultry breast derived with the method of the invention.

The number of products can be expanded. Looking to FIG. 18, two rearward products at thickness $t_2$ are revealed at 380 and 381. Additionally produced with the method are eight peripherally defined forward products at thickness $t_1/_2$ as represented at 384–391. Resultant trim components are revealed at 394 and 396.

Since certain changes may be made in the above-described method without departing from the scope of the invention herein involved, it is intended that all matter contained in the description thereof or shown in the accompanying drawings shall be interpreted as illustrative and not in a limiting sense. It will be apparent to the skilled artisan that various steps of the disclosed method may either be performed in the order set forth in the drawings and accompanying description, or the sequence of certain of the steps may be altered. Also, certain steps of the method may be performed simultaneously.

TABLE 1

| DIM LINE | AVERAGE VALUE |
|---|---|
| A | 8.10 IN |
| B | 8.03 IN |
| C | 4.62 IN |
| D | 6.70 IN |
| E | 1.89 IN |
| F | 3.13 IN |
| G | 4.30 IN |
| H | 5.08 IN |
| I | 4.10 IN |

What is claimed is:

1. The method for apportioning poultry breast into meat products, said breast having a forward portion of first general thickness tapering to a rearward portion of second general thickness less than said first general thickness, comprising the steps of:
   (a) providing at least one platen having a support surface, a forward containment wall defining the peripheral shape of a portion of a forward product formed of said breast meat forward portion, said wall extending between forward wall termini, a severance boundary extending from said wall termini and having a medial portion which defines, at least in part, with said forward containment wall a forward region corresponding with said forward product peripheral shape, said severance boundary having a rearward portion defining at least a portion of a rear region corresponding with the periphery of a rearward product formed from said breast rearward portion;
   (b) providing a die assembly having a severance component exhibiting a peripheral pattern configured to be coextensive with said severance boundary, said die assembly being movable between a retracted and an advanced position moving said severance component into severing engagement with said platen severance boundary;
   (c) providing a first conformance paddle assembly having a compression surface generally aligned with said platen forward region, said first conformance paddle being movable between a retracted and a first compression position located in spaced adjacency from said platen support surface;
   (d) placing a said breast upon said platen support surface in an orientation wherein said breast forward portion is located at said platen forward region and said breast rearward portion is located at said platen rear region;
   (e) moving said first conformance paddle assembly compression surface from said retracted position into a said first compression position effective to cause said breast forward portion to assume a substantially uniform thickness, $t_1$, and effecting the periphery defining engagement of a peripheral extent of said breast forward portion with said forward containment wall and extension of a trim component across the said medial portion of said severance receiver boundary;
   (f) moving said die assembly from said retracted to said advanced position effective to vertically sever said breast forward portion from said breast rearward portion along said severance boundary and deriving at least one peripherally defined said rearward product from said breast rearward portion; and
   (g) horizontally cutting said severed breast forward portion in a manner effective to derive at least two peripherally and thickness defined said meat products.

2. The method of claim 1 in which:
said step (c) further comprises the step:
   (c1) providing a second conformance paddle assembly having a compression surface generally aligned with said platen rear region, movable between a retracted and second compression position located in spaced adjacency from said platen support surface; and
said step (e) further comprises the step:
   (e1) moving said second conformance paddle assembly compression surface from said retracted position into a said second compression position effective to cause said breast rearward portion to assume a substantially uniform thickness, $t_2$, less than said thickness, $t_1$, and effecting the extension of a meat trim component across said severance boundary rearward portion.

3. The method of claim 2 in which:
said step (e1) moves said second conformance paddle compression surface into said second compression position effective to cause said breast rearward portion to assume a substantially uniform thickness, $t_2$, which is about one-half said thickness, $t_1$.

4. The method of claim 1 in which:
said step (a) provides said platen as having a rearward containment wall extending between rearward wall termini and defining a portion of said rear region, said severance boundary rearward portion extending from said rearward wall termini and defining therewith said periphery of said rearward product.

5. The method of claim 4 in which:
said step (a) provides said rearward containment wall of said platen as having a generally v-shaped configuration.

6. The method of claim 1 in which:
said step (a) provides said platen as having a longitudinal component of said severance boundary positioned at a location on said support surface to define a right forward region and a left forward region surface;
said step (c) provides said first conformance paddle assembly as having a right compression surface generally aligned with said platen right forward region, and a left compression surface generally aligned with said platen left forward surface;
said step (f) moves said die assembly to said advanced position to vertically sever said breast forward portion into two breast forward portions; and said step (g) horizontally cuts said two breast forward portions to derive four peripherally and thickness defined said meat products.

7. The method of claim 2 in which:

said step (a) provides said platen as having a longitudinal component of said severance boundary positioned at a location on said support surface to define a right rear region and a left rear region;

said step (c) provides said second conformance paddle assembly as having a right compressive surface generally aligned with said platen right rear region, and a left compressive surface generally aligned with said platen left rear region; and said step (f) moves said die assembly to said advanced position to vertically sever said breast rearward portion into two breast rearward portions.

8. The method of claim 1 in which:

said step (a) provides said platen as having a said severance boundary which includes a laterally disposed portion extending across said forward region to define a two part said forward product peripheral shape; and said step (g) horizontally cuts said two part forward product.

9. The method of apportioning poultry breast into meat products said breast having a forward portion tapering to a thinner rearward portion and a whole breast weight equal to or greater than about 16 ounces, comprising the steps of:

(a) compressing said breast forward portion against a containment wall defining at least a portion of the periphery of a forward said meat product, said compression establishing substantially flat upper and lower meat surfaces spaced apart a substantially uniform forward thickness, $t_1$;

(b) compressing said breast rearward portion against a containment wall defining at least a portion of the periphery of a rear said meat product, said compression establishing substantially flat upper and lower meat surfaces spaced apart a substantially uniform rear thickness, $t_2$, less than said forward thickness, $t_1$;

(c) severing said compressed breast forward portion from said compressed breast rearward portion;

(d) trimming said compressed breast forward portion to define a forward periphery of a meat product exhibiting said thickness, $t_1$; and (e) horizontally severing said compressed and trimmed breast forward portion.

10. The method of claim 9 in which:

said step (d) further comprises the step: (d) trimming said compressed breast rearward portion to define a rear periphery of a meat product exhibiting said thickness, $t_2$.

11. The method of claim 9 in which:

said steps (a) and (b) compress respective said breast forward portion and breast rearward portion to an extent wherein said thickness, $t_2$, is about one-half said thickness, $t_1$.

12. The method of claim 9 in which:

said step (b) compresses said breast rearward portion against a said containment wall exhibiting a generally v-shaped periphery.

13. The method of claim 9 in which:

said step (c) further comprises the step: (c1) severing said compressed breast forward portion longitudinally in half.

14. The method of claim 9 in which:

said step (c) further comprises the step: (c2) severing said compressed breast rearward portion longitudinally in half.

* * * * *